United States Patent
Li et al.

(10) Patent No.: US 10,181,184 B2
(45) Date of Patent: Jan. 15, 2019

(54) METHOD AND APPARATUS FOR IDENTIFYING IMAGE TYPE

(71) Applicant: Beijing Xiaomi Mobile Software Co., Ltd., Beijing (CN)

(72) Inventors: Guosheng Li, Beijing (CN); Lin Dai, Beijing (CN); Jiangtao Huang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 26 days.

(21) Appl. No.: 15/437,989

(22) Filed: Feb. 21, 2017

(65) Prior Publication Data

US 2017/0243338 A1    Aug. 24, 2017

(30) Foreign Application Priority Data

Feb. 22, 2016  (CN) .......................... 2016 1 0097153

(51) Int. Cl.
  *G06T 5/40* (2006.01)
  *G06K 9/00* (2006.01)
  *G06T 5/00* (2006.01)
  *G06K 9/46* (2006.01)

(52) U.S. Cl.
  CPC ............ *G06T 5/40* (2013.01); *G06K 9/00624* (2013.01); *G06K 9/4642* (2013.01); *G06K 9/4652* (2013.01); *G06T 5/002* (2013.01); *G06T 2207/10024* (2013.01)

(58) Field of Classification Search
  CPC . G06T 5/40; G06T 5/002; G06T 2207/10024; G06K 9/4652; G06K 9/4642; G06K 9/00624
  See application file for complete search history.

(56) References Cited

U.S. PATENT DOCUMENTS

| 7,263,208 B1 * | 8/2007 | Crosby | G06K 9/3241 382/103 |
| 7,949,201 B2 * | 5/2011 | Suzuki | G06T 5/008 382/274 |
| 2002/0031268 A1 * | 3/2002 | Prabhakar | G06K 9/00456 382/224 |

(Continued)

FOREIGN PATENT DOCUMENTS

| CN | 101131365 A | 2/2008 |
| CN | 102663451 A | 9/2012 |

(Continued)

OTHER PUBLICATIONS

International Search Report for Application No. PCT/CN2016/100456, from the State Intellectual Property Office of China, dated Jan. 5, 2017.

(Continued)

*Primary Examiner* — Ming Y Hon
(74) *Attorney, Agent, or Firm* — Finnegan, Henderson, Farabow, Garrett & Dunner LLP

(57) ABSTRACT

A method is provided for identifying an image type. The method includes acquiring a histogram of a channel in a preset color space of an image to be identified, calculating a ratio between a quantity of pixels of a gray-scale value and a quantity of pixels of an adjacent gray-scale value in the channel according to the histogram, and determining a type of the image according to the ratio.

18 Claims, 8 Drawing Sheets

(56) References Cited

U.S. PATENT DOCUMENTS

| | | | | |
|---|---|---|---|---|
| 2003/0128874 | A1* | 7/2003 | Fan | G06K 9/00456 382/170 |
| 2004/0161152 | A1* | 8/2004 | Marconi | G06K 9/00456 382/190 |
| 2005/0123195 | A1* | 6/2005 | Takarada | G06K 9/38 382/172 |
| 2005/0185012 | A1* | 8/2005 | Yoshida | B41J 29/393 347/19 |
| 2006/0204086 | A1* | 9/2006 | Gargi | H04N 1/644 382/166 |
| 2010/0008568 | A1 | 1/2010 | Curti et al. | |
| 2013/0259375 | A1 | 10/2013 | Dunlop et al. | |
| 2014/0241629 | A1 | 8/2014 | Lerios et al. | |
| 2015/0086135 | A1 | 3/2015 | Tsai et al. | |
| 2015/0332444 | A1* | 11/2015 | Tsuda | H04N 1/407 382/167 |
| 2016/0148074 | A1* | 5/2016 | Jean | G06K 9/4671 382/190 |

FOREIGN PATENT DOCUMENTS

| | | |
|---|---|---|
| CN | 104200431 A | 12/2014 |
| CN | 105118026 A | 12/2015 |
| CN | 105282531 A | 1/2016 |
| CN | 105760884 A | 7/2016 |
| EP | 1413986 A2 | 4/2004 |
| EP | 1326425 B1 | 8/2008 |
| JP | 64-50177 A | 2/1989 |
| JP | 2003-125213 A | 4/2003 |
| JP | 2004-70427 A | 3/2004 |
| JP | 2004-530992 A | 10/2004 |
| RU | 2400815 C2 | 9/2010 |

OTHER PUBLICATIONS

Farinella, et al., "Representation Models and Machine Learning Techniques for Scene Classification," Research Gate, dated May 1, 2012, retrieved from https://www.researchgate.net/publication/228943067_Representation_Models_and_Machine_Learning_Techniques_for_Scene_Classification.

Extended European Search Report issued in European Patent Application No. 17157179.7, mailed from the European Patent Office, dated Jul. 17, 2017.

English version of International Search Report issued in International Application No. PCT/CN2016/100456, mailed from the State Intellectual Property Office of the P.R. China dated Jan. 5, 2017.

* cited by examiner

METHOD AND APPARATUS FOR IDENTIFYING IMAGE TYPE

CROSS-REFERENCE TO RELATED APPLICATION

This application is based upon and claims priority to Chinese Patent Application No. 201610097153.1, filed Feb. 22, 2016, the entire contents of which are incorporated herein by reference.

TECHNICAL FIELD

The present disclosure generally relates to the field of communication technology, and more particularly, to a method and apparatus for identifying image type.

BACKGROUND

Images displayed on display devices may be generally divided into two types: synthetic images and natural images. The synthetic images are images that are artificially synthetized by using a computer, such as cartoons, application icons, etc. And the natural images are images that exist in the natural world and are captured by an image acquiring device, for example, a camera. In general, a synthetic image is artificially plotted according to characteristics of a display device such that contents of the synthetic image conform to the characteristics of the display device. For example, a beautiful image may be plotted according to a bit depth, a color gamut and a contrast ratio which the display device is capable of presenting. A natural image generally exhibits contents really existing in the natural world, without being processed with respect to characteristics of a specific display device. Thereby, a natural image may be post-processed using a specific image processing technique to make the natural image more beautiful. Post-processing of a synthetic image, however, may damage the beauty of the synthetic image.

Therefore, before performing a post-processing on an image, it is necessary to identify the type of the image, such that an operation (e.g., post-processing) may be determined whether to be executed on the image according to the identified type of the image. In this way, the beauty of the image may be retained.

Conventionally, the type of an image may be identified by calculating an entropy of the image. If the entropy of the image is greater than a preset threshold value, the image is determined as a natural image; and if the entropy of the image is smaller than or equal to the preset threshold value, the image is determined as a synthetic image.

SUMMARY

According to a first aspect of embodiments of the present disclosure, a method is provided for identifying an image type. The method includes acquiring a histogram of a channel in a preset color space of an image to be identified, calculating a ratio between a quantity of pixels of a gray-scale value and a quantity of pixels of an adjacent gray-scale value in the channel according to the histogram, and determining a type of the image according to the ratio.

According to a second aspect of embodiments of the present disclosure, an apparatus is provided for identifying an image type. The apparatus includes a processor, and a memory for storing instructions executable by the processor. The processor is configured to acquire a histogram of a channel in a preset color space of an image to be identified, calculate a ratio between a quantity of pixels of a gray-scale value and a quantity of pixels of an adjacent gray-scale value in the channel according to the histogram, and determine a type of the image according to the ratio.

According to a third aspect of the embodiments of the present disclosure, a non-transitory computer-readable storage medium having stored thereon instructions is provided. The instructions, when executed by a processor in a terminal, cause the terminal to perform a method for identifying an image type. The method includes acquiring a histogram of a channel in a preset color space of an image to be identified, calculating a ratio between a quantity of pixels of a gray-scale value and a quantity of pixels of an adjacent gray-scale value in the channel according to the histogram, and determining a type of the image according to the ratio.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely exemplary apparatuses and methods consistent with aspects related to the invention as recited in the appended claims.

Figure 1:
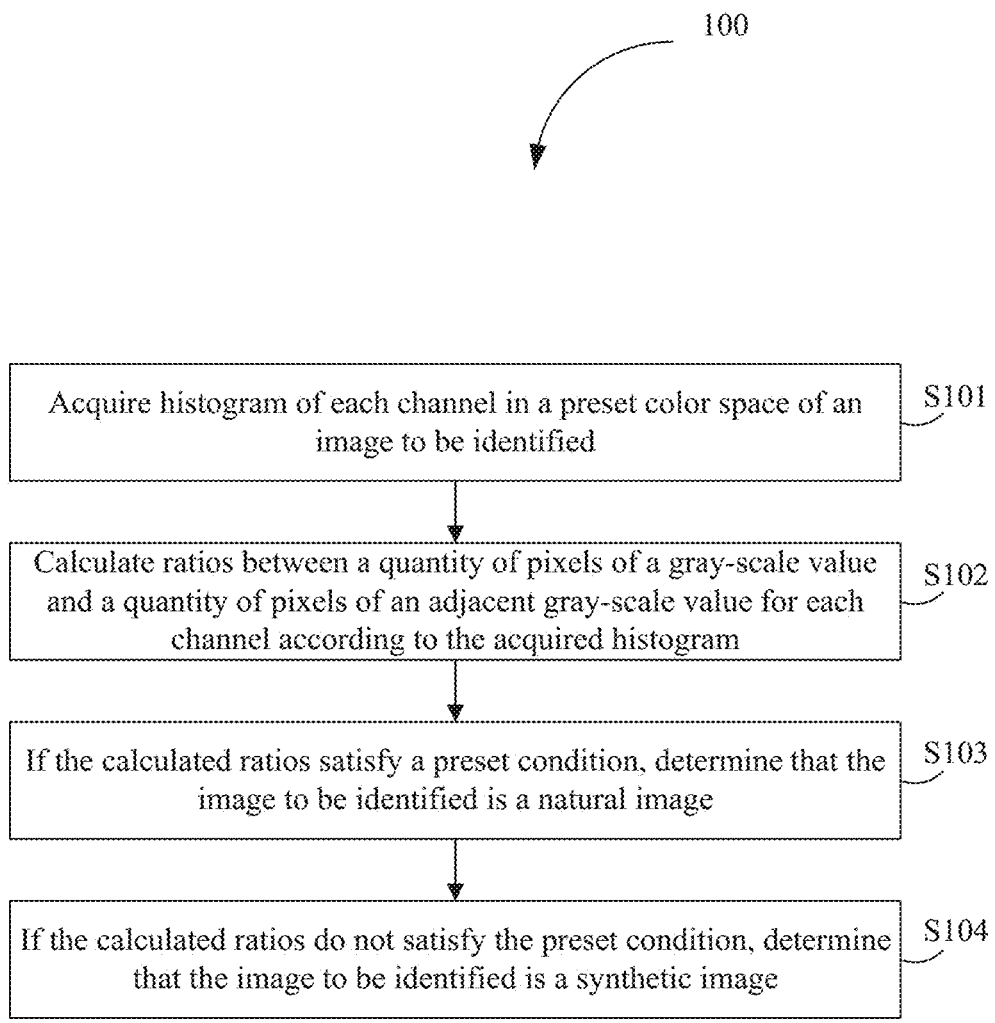
FIG. 1 is a flow chart of a method for identifying an image type, according to an exemplary embodiment.

FIG. 1 is a flow chart of a method 100 for identifying an image type, according to an exemplary embodiment. As shown in FIG. 1, the method 100 may be applied to a mobile terminal. The mobile terminal may include, but is not limited to, a mobile phone, and a tablet computer (e.g., a PAD). The method 100 may include the following steps.

In step S101, a histogram of each channel in a preset color space of an image to be identified is acquired.

In the exemplary embodiment, different types of images have different characteristics in the histogram of each channel in the preset color space. Thereby, the type of an image may be identified by analyzing characteristics of the histogram of each channel.

Figure 2A:
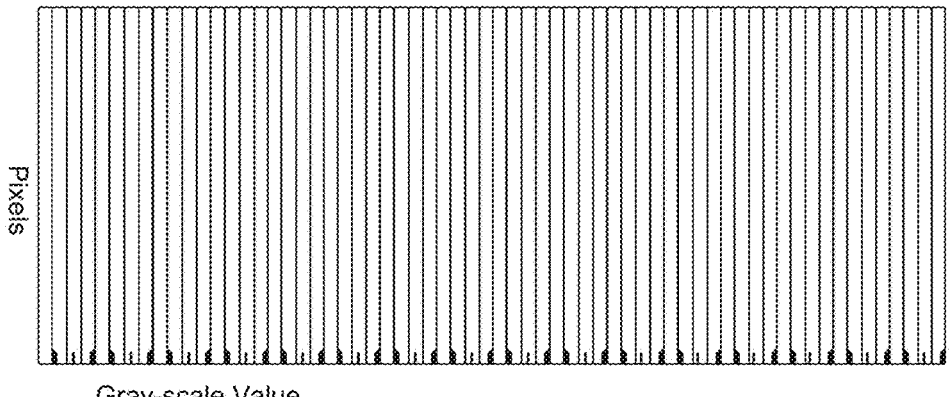
FIG. 2a is a schematic diagram of a histogram of a red channel of an image to be identified, according to an exemplary embodiment.
Figure 2B:
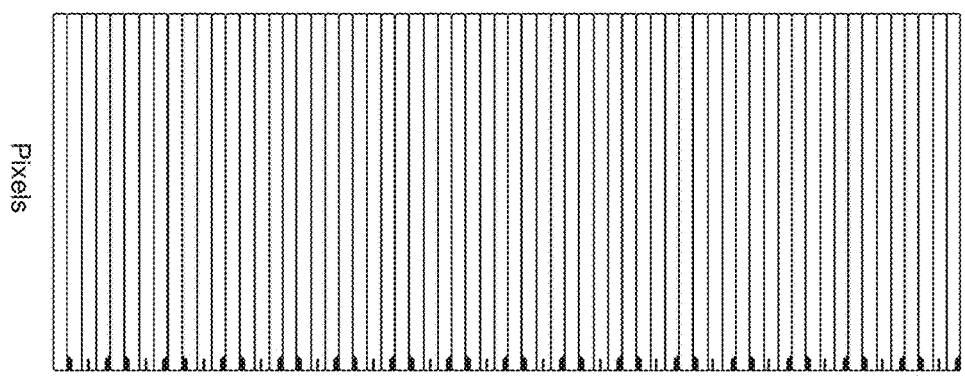
FIG. 2b is a schematic diagram of a histogram of a green channel of the image to be identified, according to an exemplary embodiment.
Figure 2C:
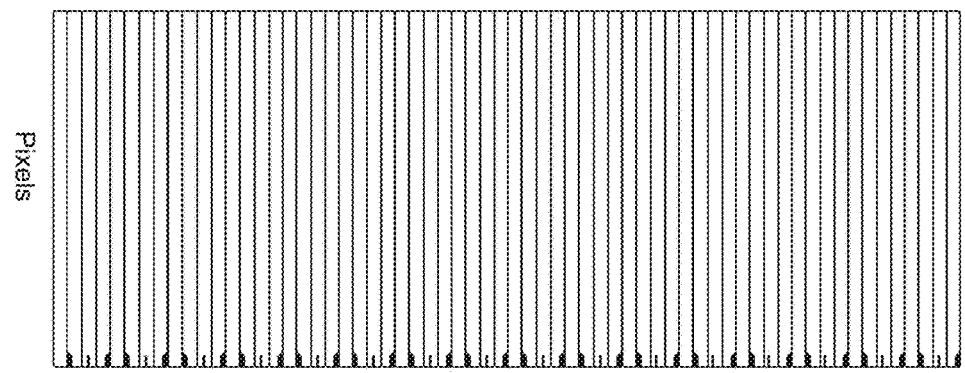
FIG. 2c is a schematic diagram of a histogram of a blue channel of the image to be identified, according to an exemplary embodiment.
Figure 3A:
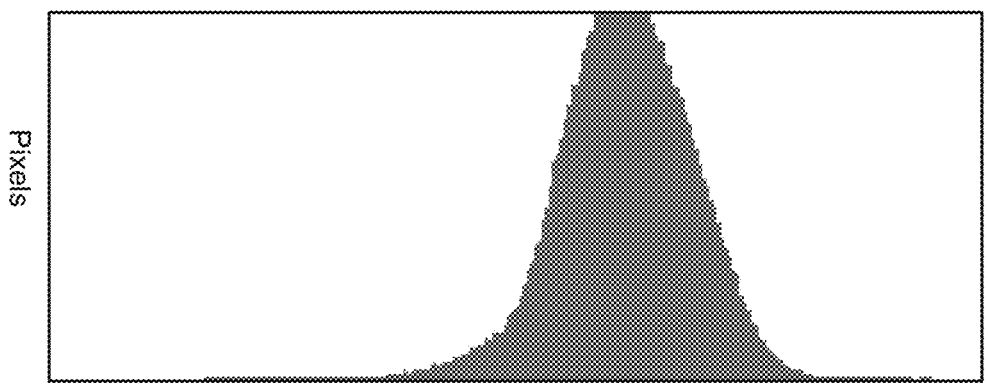
FIG. 3a is a schematic diagram of a histogram of a red channel of an image to be identified, according to another exemplary embodiment.
Figure 3B:
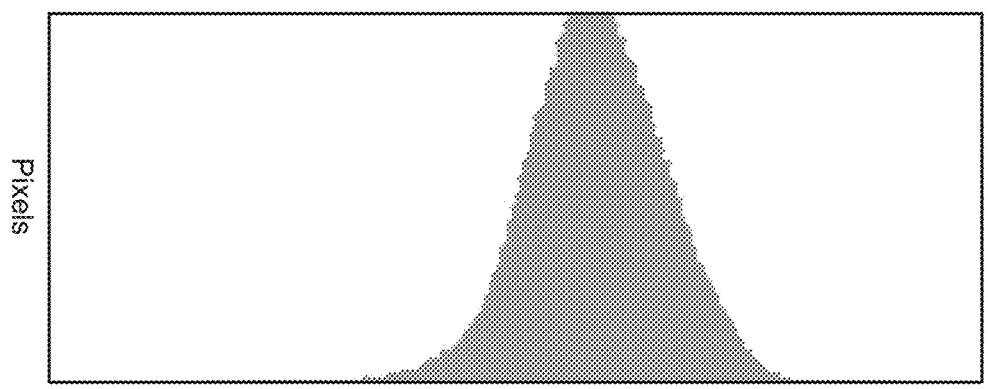
FIG. 3b is a schematic diagram of a histogram of a green channel of the image to be identified, according to another exemplary embodiment.
Figure 3C:
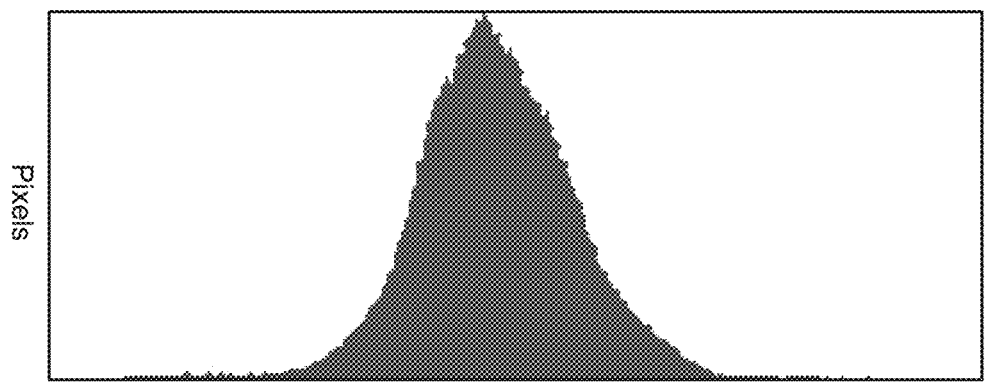
FIG. 3c is a schematic diagram of a histogram of a blue channel of the image to be identified, according to another exemplary embodiment.

The preset color space may be a color space including, such as a red-green-blue (RGB) color space, or a luminance (LAB) color space. For example, a histogram of each channel in the RGB color space of an image to be identified may be acquired. FIGS. 2a-2c show an example of the histograms of three channels (red, green, and blue, respectively) in the RGB color space of an image to be identified. FIGS. 3a-3c show another example of the histograms of the three channels (red, green, and blue, respectively) in the RGB color space of the image to be identified. The horizontal axis of the histograms indicates gray-scale values of 0-255, and the vertical axis thereof indicates a quantity of pixels corresponding to a gray-scale value.

In step S102, ratios between a quantity of pixels of a gray-scale value and a quantity of pixels of an adjacent gray-scale value are calculated for each channel according to the acquired histogram.

In the exemplary embodiment, the ratios between a quantity of pixels of a gray-scale value and a quantity of pixels of an adjacent gray-scale value for each channel of the image may be calculated according to the acquired histograms. For example, the ratios between a quantity of pixels of a gray-scale value and a quantity of pixels of an adjacent gray-scale value for each of the three channels (red, green, and blue, respectively) may be calculated according to the histograms in FIGS. 2a-2c, or the histograms in FIGS. 3a-3c.

For example, for each channel, a ratio between a quantity of pixels of a gray-scale value i and a quantity of pixels of a gray-scale value (i−n), and a ratio between a quantity of pixels of the gray-scale value i and a quantity of pixels of a gray-scale value (i+n) are calculated, wherein n≤i≤255−n, 1≤n≤10, and both i and n are integers. In some embodiments, n may range from 1 to 5.

For example, the following ratios in the red channel may be calculated: a ratio between a quantity of pixels of a gray-scale value 1 and a quantity of pixels of a gray-scale value 0 and a ratio between the quantity of pixels of the gray-scale value 1 and a quantity of pixels of a gray-scale value 2, a ratio between the quantity of pixels of the gray-scale value 2 and the quantity of pixels of the gray-scale value 1 and a ratio between the quantity of pixels of the gray-scale value 2 and a quantity of pixels of a gray-scale value 3, a ratio between the quantity of pixels of the gray-scale value 3 and the quantity of pixels of the gray-scale value 2 and a ratio between the quantity of pixels of the gray-scale value 3 and a quantity of pixels of a gray-scale value 4, . . . , a ratio between a quantity of pixels of a gray-scale value 254 and a quantity of pixels of a gray-scale value 253 and a ratio between the quantity of pixels of the gray-scale value 254 and a quantity of pixels of a gray-scale value 255.

In the histogram of the red channel shown in FIG. 3a, for example, there are 1624 pixels of the gray-scale value 89, 1609 pixels of the gray-scale value 90, and 1554 pixels of the gray-scale value 91. Thus, a ratio between the quantity of pixels of the gray-scale value 90 and the quantity of pixels of the gray-scale value 89 is 0.9907635 (i.e., 1609 divided by 1624), and a ratio between the quantity of pixels of the gray-scale value 90 and the quantity of pixels of the gray-scale value 91 is 1.03539253 (i.e., 1609 divided by 1554).

In step S103, if the calculated ratios satisfy a preset condition, the image to be identified is determined as a natural image.

In the exemplary embodiment, when the preset color space is an RGB color space, the preset condition may be: a number of decimal places of the ratio exceeds 5. If the calculated ratio satisfies a preset condition, i.e., the number of decimal places of the calculated ratio exceeds 5, then the image to be identified is a natural image. For example in FIG. 3a, since the ratio between the quantity of pixels of the gray-scale value 90 and the quantity of pixels of the gray-scale value 89 is 0.9907635, and the ratio between the quantity of pixels of the gray-scale value 90 and the quantity of pixels of the gray-scale value 91 is 1.03539253, the number of decimal places of both ratios exceed 5. As such, the image corresponding to FIG. 3a may be preliminarily identified as a natural image. Further, If the numbers of decimal places of ratios between pixels of adjacent gray-scale values in the histograms shown in FIGS. 3b-3c also exceed 5, then it can be determined that the image corresponding to FIGS. 3a-3c is a natural image.

In step S104, if the calculated ratios do not satisfy the preset condition, the image to be identified may be determined as a synthetic image.

In the exemplary embodiment, if the calculated ratio does not satisfy the preset condition, i.e., the calculated ratio is an integer or the number of decimal places of the calculated ratio does not exceed 5, then the image to be identified is a synthetic image.

For example, in the histogram of the red channel shown in FIG. 2a, a ratio between a quantity of pixels of a gray-scale value 1 and a quantity of pixels of a gray-scale vale 0 is 0.01, and a ratio between the quantity of pixel of the gray-scale value 1 and a quantity of pixels of a gray-scale value 2 is 100. Since the calculated ratios do not satisfy the preset condition (i.e., the number of decimal places for each of the two ratio is less than 5), an image corresponding to FIG. 2a may be preliminarily determined to be a synthetic image. Further, if the number of decimal places for each of the ratios between pixels of adjacent gray-scale values in the histograms shown in FIGS. 2b-2c does not satisfy the preset condition either, then the image corresponding to FIGS. 2a-2c can be determined as a synthetic image.

In some embodiments, in order to improve the accuracy of identifying image type, the method 100 may further include: counting the ratios which do not satisfy the preset condition. If the number of the ratios exceeds a preset number, the image to be identified may be identified as a synthetic image. The preset number may be set flexibly according to requirements, for example, may be 6, 8, or the like. For example, in the histograms of three channels shown in FIGS. 2a-2c, if the number of the ratios which do not satisfy the preset condition is 508 for each of the three channels, then it may be further determined that the image corresponding to FIGS. 2a-2c is a synthetic image.

In the above exemplary embodiment, a histogram for each channel in a preset color space of an image to be identified is obtained. Ratios between pixels of adjacent gray-scale values in each channel are calculated according to the acquired histograms. The type of the image to be identified may be determined according to whether the ratios satisfy a preset condition. No extensive computations may be needed during the entire identifying procedure, thus the present disclosure may be suitable for identifying an image type on a mobile terminal, such as a mobile phone.

Figure 4:
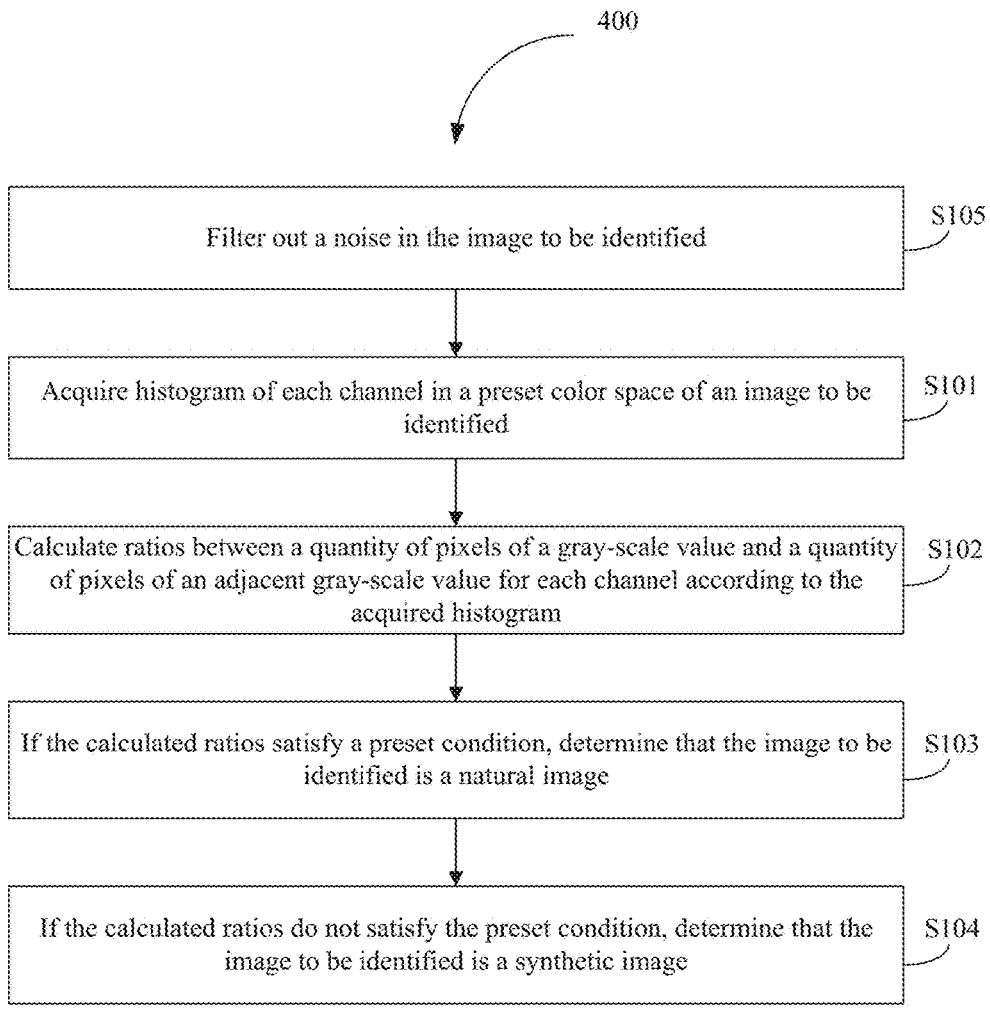
FIG. 4 is a flow chart of a method for identifying an image type, according to another exemplary embodiment.

FIG. 4 is a flow chart of a method 400 for identifying an image type, according to another exemplary embodiment. As shown in FIG. 4, in addition to the steps shown in FIG. 1, the method 400 may further include the following step S105.

In step S105, a noise in the image to be identified is filtered out.

The noise in the image primarily refers to a rough portion in the image generated when a sensor of a camera receives light rays as receiving signals and outputs the light rays. The noise may also refer to foreign pixels that are generally generated, for example by electronic interferences. The foreign pixels should not exist in the image.

In the exemplary embodiment, before acquiring the histogram for each channel in the preset color space of the image to be identified, a noise in the image may be filtered out. In this way, the acquired histograms may be more accurate, and the accuracy of identifying image type is thus improved.

Figure 5:
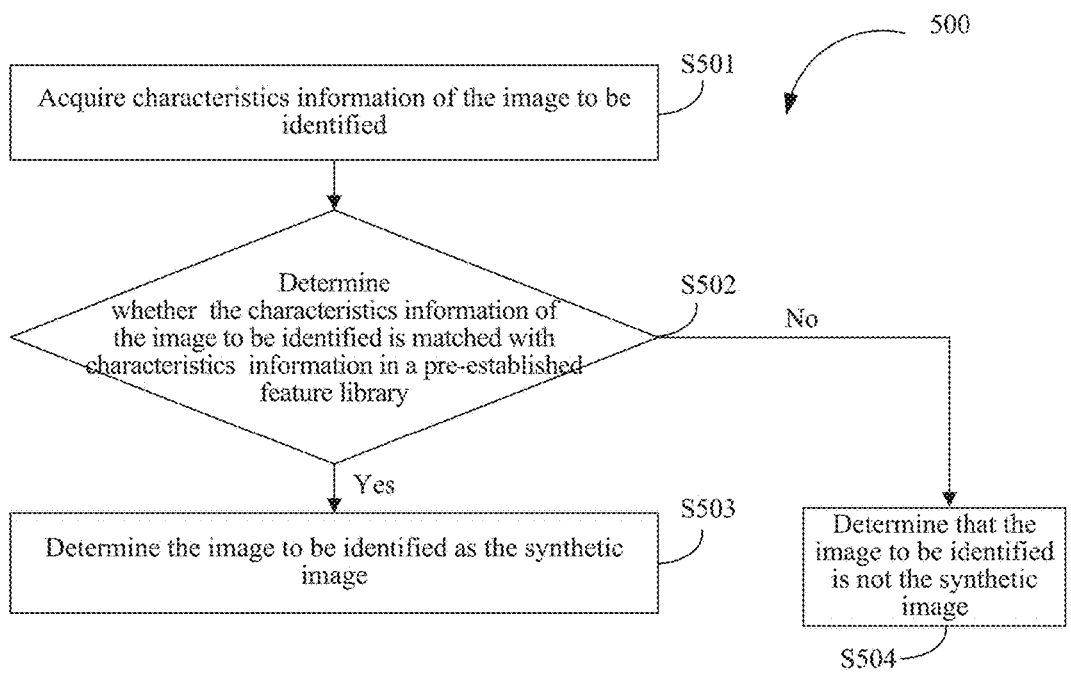
FIG. 5 is a flow chart of a method for identifying an image type, according to yet another exemplary embodiment.

FIG. 5 is a flow chart of a method 500 for identifying image type, according to another exemplary embodiment. As shown in FIG. 5, the method 500 may further include the following steps.

In step S501, characteristics information of the image to be identified is acquired.

In the exemplary embodiment, a characteristics library of synthetic images may be established in advance. The characteristics library includes characteristics information of the synthetic images. Thereby, by acquiring characteristics information of an image to be identified, and comparing the acquired characteristics information with characteristics information of the characteristics library, it may identify whether the image to be identified is a synthetic image.

The characteristics library may include, but is not limited to, one or more of characteristics information of pixel numbers in three channels in an RGB color space of synthetic images, characteristics information of monochromic image of synthetic images, and the like.

In the exemplary embodiment, in order to compare with the characteristics information in the characteristics library, characteristics information of pixel numbers in three channels of an RGB color space of the image to be identified may be acquired, or the characteristics information of red image of the image to be identified may be acquired.

In step S502, it is determined whether the characteristics information of the image to be identified matches the characteristics information in a pre-established characteristics library. If they match, step S503 is performed: otherwise, step S504 is performed.

In step S503, the image to be identified is determined as a synthetic image.

For example, as shown in FIGS. 2a-2c, the histograms of RGB three channels of the image to be identified are identical. As such, it can be acquired that the pixel numbers of RGB three channels of the image to be identified are identical, i.e., characteristics information of the image matches the characteristics information in the characteristics library. Accordingly, it may be determined that the image to be identified is a synthetic image.

In step S504, it is determined that the image to be identified is not a synthetic image.

In the exemplary embodiment, if the characteristics information of the image to be identified does not match the characteristics information in the pre-established characteristics library, it may be determined that the image to be identified is not a synthetic image.

In some embodiments, in addition to using this manner to identify an image type, it may also use this manner to correct an image type that has already been identified. For example, given that an image has been identified as a synthetic image, it may further determine whether the image is a synthetic image by acquiring characteristics information of the image and comparing the acquired characteristics information with characteristics information in a characteristics library. As such, the accurate rate of identification may be significantly improved.

In the above exemplary embodiment, whether an image to be identified is a synthetic image is determined by determining whether the acquired characteristics information of the image to be identified matches characteristics information in a pre-established characteristics library, providing an additional means for identifying a synthetic image. As such, the manners for identifying image type are diversified. In addition, such means may also be employed to correct an already identified image type, thereby greatly improving the accuracy rate of identification.

Corresponding to the above methods for identifying an image type, the present disclosure also provides apparatus embodiments for identifying an image type.

Figure 6:
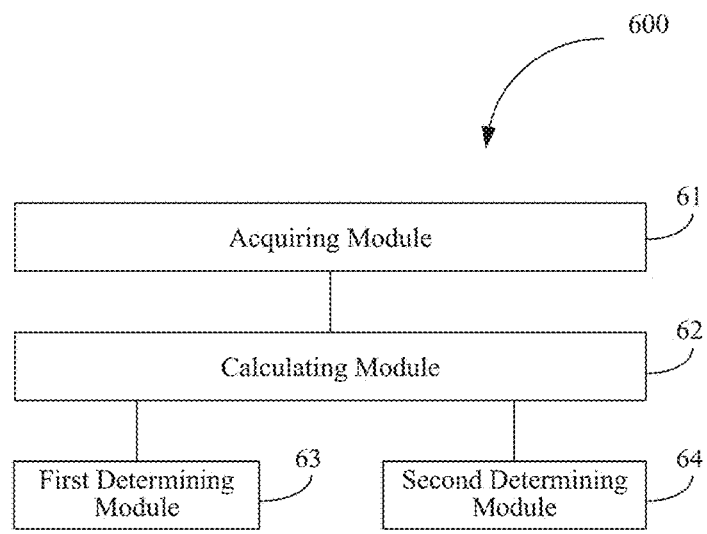
FIG. 6 is a block diagram of an apparatus for identifying an image type, according to an exemplary embodiment.

FIG. 6 is a block diagram of an apparatus 600 for identifying an image type, according to an exemplary embodiment. As shown in FIG. 6, the apparatus 600 may include an acquiring module 61, a calculating module 62, a first determining module 63, and a second determining module 64.

The acquiring module 61 is configured to acquire a histogram of each channel in a preset color space of an image to be identified.

In the exemplary embodiment, different types of images have different characteristics in the histograms of respective channels in the preset color space. Thereby, the type of an image may be identified by analyzing the characteristics of the histograms.

The preset color space may be a color space including, such as a red-green-blue (RGB) color space, or a luminance (LAB) color space.

For example, histograms of respective channels in the RGB color space of an image to be identified may be acquired. FIGS. 2a-2c show an example of histograms of RGB three channels (red, green, and blue, respectively) of an image to be identified, FIGS. 3a-3c show another example of histograms of RGB three channels (red, green, and blue, respectively) of an image to be identified.

The horizontal axis of the histograms indicates gray-scale values 0-225, and the vertical axis thereof indicates a quantity of pixels corresponding to a gray-scale value.

The calculating module 62 is configured to calculate ratios between pixels of adjacent gray-scale values in each channel according to the histograms acquired by the acquiring module 61.

In the exemplary embodiment, the ratios between pixel quantities of adjacent gray-scale values in each channel of the image may be calculated according to the acquired histograms.

For example, ratios between pixel quantities of adjacent gray-scale values in RGB three channels may be calculated according to the histograms shown in FIGS. 2a-2c, or the histograms shown in FIGS. 3a-3c.

In the exemplary embodiment, the manner for calculating the ratios between pixel quantities of adjacent gray-scale values in each channel may be as follows.

For example, for each channel, a ratio between a quantity of pixels of a gray-scale value i and a quantity of pixels of a gray-scale value (i−n) and a ratio between the quantity of pixels of the gray-scale value i and a quantity of pixels of a gray-scale value (i+n) may be calculated, wherein n≤i≤255−n, 1≤n≤10, and both i and n are integers. In some embodiments, n may range from 1 to 5.

For example, the following ratios in the red channel may be calculated: a ratio between a quantity of pixels of a gray-scale value 1 and a quantity of pixels of a gray-scale value 0 and a ratio between the quantity of pixels of the gray-scale value 1 and a quantity of pixels of a gray-scale value 2, a ratio between the quantity of pixels of the gray-scale value 2 and the quantity of pixels of the gray-scale value 1 and a ratio between the quantity of pixels of the gray-scale value 2 and a quantity of pixels of a gray-scale value 3, a ratio between the quantity of pixels of the gray-scale value 3 and the quantity of pixels of the gray-scale value 2 and a ratio between the quantity of pixels of the gray-scale value 3 and a quantity of pixels of a gray-scale value 4, . . . , a ratio between a quantity of pixels of a gray-scale value 254 and a quantity of pixels of a gray-scale value 253 and a ratio between the quantity of pixels of the gray-scale value 254 and a quantity of pixels of a gray-scale value 255.

For example, in the histogram of the red channel shown in FIG. 3a, there are 1624 pixels of the gray-scale value 89, 1609 pixels of the gray-scale value 90, and 1554 pixels of the gray-scale value 91. A ratio between the quantity of pixels of the gray-scale value 90 and the quantity of pixels of the gray-scale value 89 is 0.9907635 (i.e., 1609 divided by 1624), and a ratio between the quantity of pixels of the gray-scale value 90 and the quantity of pixels of the gray-scale value 91 is 1.03539253 (i.e., 1609 divided by 1554).

The first determining module 63 is configured to, if the ratio calculated by the calculating module 62 satisfies a preset condition, determine the image as a natural image.

In the exemplary embodiment, when the preset color space is RGB, the preset condition may be: a number of decimal places of the ratio exceeds 5. If the calculated ratio satisfies a preset condition, i.e., the number of decimal places of the calculated ratio exceeds 5, then the image to be identified is a natural image.

In the above example, since the ratio between the quantity of pixels of the gray-scale value 90 and the quantity of pixels of the gray-scale value 89 is 0.9907635, and the ratio between quantity of pixels of the gray-scale value 90 and the quantity of pixels of the gray-scale value 91 is 1.03539253, the numbers of decimal places of both ratios exceed 5. As such, it may be determined preliminarily that the image corresponding to FIG. 3a is a natural image. Further, if the numbers of decimal places of the ratios between pixel quantities of adjacent gray-scale values in the histograms shown in FIGS. 3b-3c also exceed 5, then it can be determined that the image corresponding to FIGS. 3a-3c is a natural image.

The second determining module 64 is configured to, if the ratio calculated by the calculating module 62 does not satisfy the preset condition, determine the image to be identified as a synthetic image.

In the exemplary embodiment, if the calculated ratio does not satisfy the preset condition, i.e., the calculated ratio is an integer or the number of decimal places of the calculated ratio does not exceed 5, then the image to be identified is a synthetic image.

For example, in the histogram of the red channel shown in FIG. 2a, a ratio between the quantity of pixels of the gray-scale value 1 and the quantity of pixels of the gray-scale value 0 is 0.01, and a ratio between the quantity of pixels of the gray-scale value 1 and the quantity of pixels of the gray-scale value 2 is 100. Since the calculated ratios do not satisfy the preset condition, it may be determined preliminarily that the image corresponding to FIG. 2a is a synthetic image. Further, if the numbers of decimal places of the ratios between the quantities of pixels of adjacent gray-scale values in the histograms shown in FIGS. 2b-2c do not satisfy the preset condition either, then it can be determined that the image corresponding to FIGS. 2a-2c is a synthetic image.

The apparatus 600 shown in FIG. 6 may be applied for implementing the method 100 shown in FIG. 1, and the involved relevant contents are similar, which are not repeated herein.

In the above exemplary embodiments of the apparatus 600 for identifying an image type, histograms of respective channels in a preset color space of an image to be identified are acquired. Ratios between quantities of pixels of adjacent gray-scale values in respective channels according to the acquired histograms are calculated. And then the type of the image to be identified is determined according to whether the ratios satisfy a preset condition. No extensive computations may be needed during the entire identifying procedure, thus the present disclosure may be suitable for identifying image type in a mobile terminal, such as the mobile phone.

Figure 7:
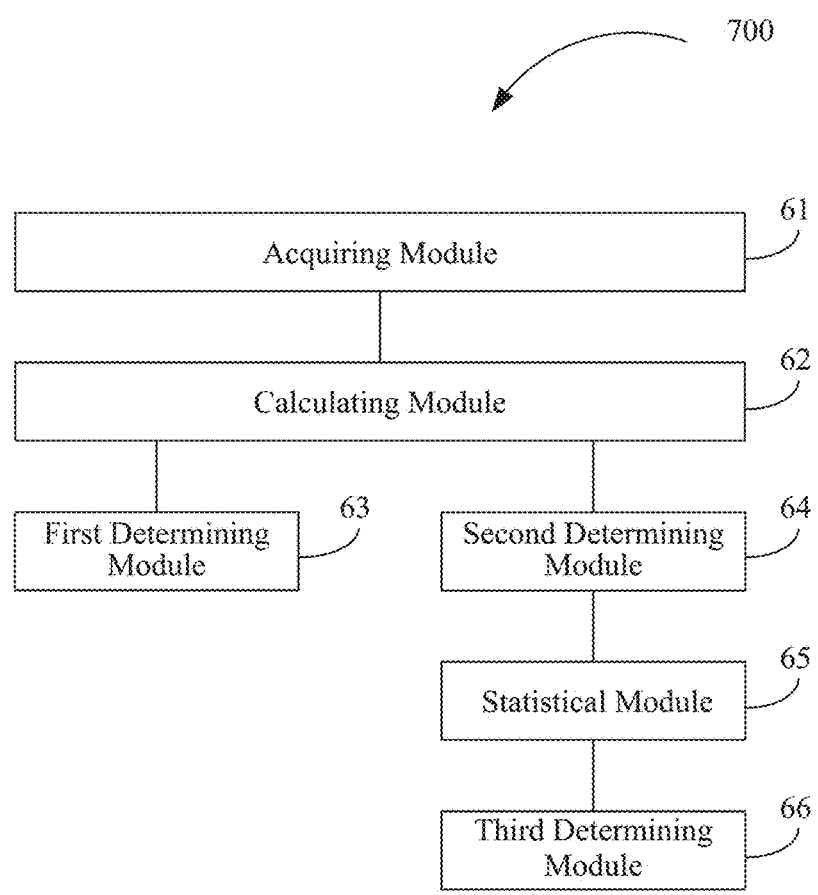
FIG. 7 is a block diagram of an apparatus for identifying an image type, according to another exemplary embodiment.

FIG. 7 is a block diagram of an apparatus 700 for identifying an image type, according to another exemplary embodiment. As shown in FIG. 7, in addition to the modules shown in FIG. 6, the apparatus 700) may further include a statistical module 65 and a third determining module 66.

The statistical module 65 is configured to count the ratios which do not satisfy the preset condition.

The third determining module 66 is configured to, if the number of the ratios obtained by the statistical module 65 exceeds a preset number, determine the image to be identified as a synthetic image.

In the exemplary embodiment, in order to improve accuracy rate of identifying image type, the apparatus 700 further counts the ratios which do not satisfy the preset condition. If the number of the ratios exceeds a preset number, the image to be identified may be determined as a synthetic image. The preset number may be set flexibly according to requirements, for example, may be 6, or 8, or the like.

For example, in the histograms of three channels shown in FIGS. 2a-2c, the number of the ratios which do not satisfy the preset condition is 508 for each channel, then it may be further determined that the image corresponding to FIGS. 2a-2c is a synthetic image.

The apparatus 700 shown in FIG. 7 may be applied for implementing the method 100 procedure shown in FIG. 1, and the involved relevant contents are similar, which are not repeated herein.

In the above exemplary embodiments of apparatus 700 for identifying image type, when the statistical number of the ratios exceeds the preset number, it is determined that the image to be identified is a synthetic image. As such, the accuracy rate of identifying image type may be improved.

Figure 8:
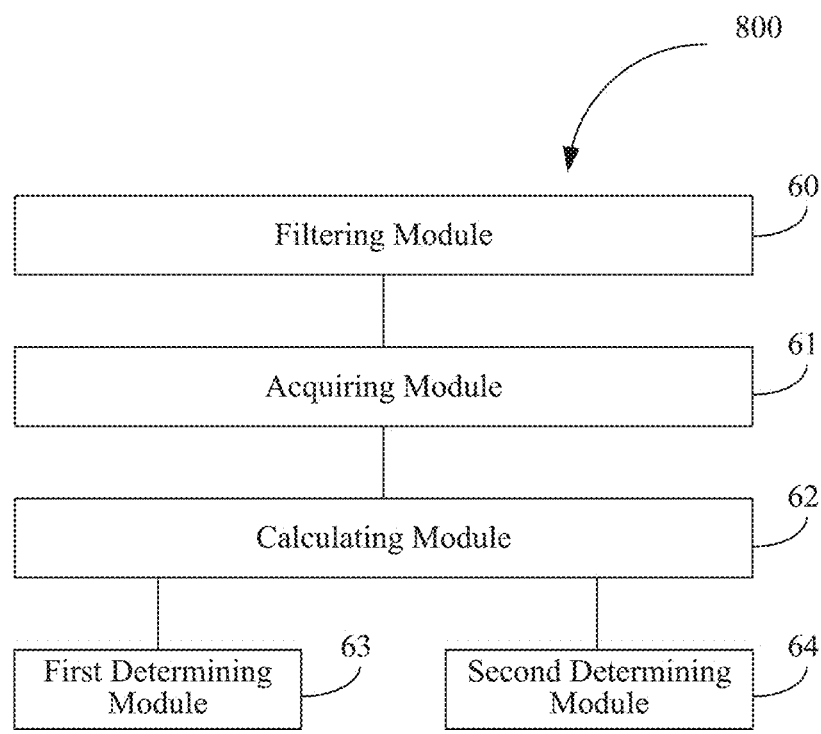
FIG. 8 is a block diagram of an apparatus for identifying an image type, according to yet another exemplary embodiment.

FIG. 8 is a block diagram of an apparatus 800 for identifying an image type, according to another exemplary embodiment. As shown in FIG. 8, in addition to the modules shown in FIG. 6, the apparatus 800 may further include a filtering module 60.

The filtering module 60 is configured to, before acquiring the histograms of respective channels in the preset color space of the image to be identified by the acquiring module 61, filter out a noise in the image to be identified.

The noise in the image mainly refers to a rough portion in the image generated when a sensor of a camera receives light rays as receiving signals and outputs the light rays. The noise may also refer to foreign pixels, which is generally generated by electronic interferences. And the foreign pixels should not exist in the image.

In the exemplary embodiment, before acquiring the histograms of respective channels in the preset color space of the image to be identified, the noise in the image to be identified may be filtered out. In this way, the acquired histograms may be more accurate, and the accuracy rate of identifying image type is thus improved.

The apparatus 800 shown in FIG. 8 may be applied for implementing the method 400 shown in FIG. 4, and the involved relevant contents are similar, which are not repeated herein.

In the above exemplary embodiment of the apparatus 800 for identifying an image type, the noise in the image to be identified is filtered out. The acquired histograms are more accurate, and the accuracy rate of identifying an image type is thus improved.

Figure 9:
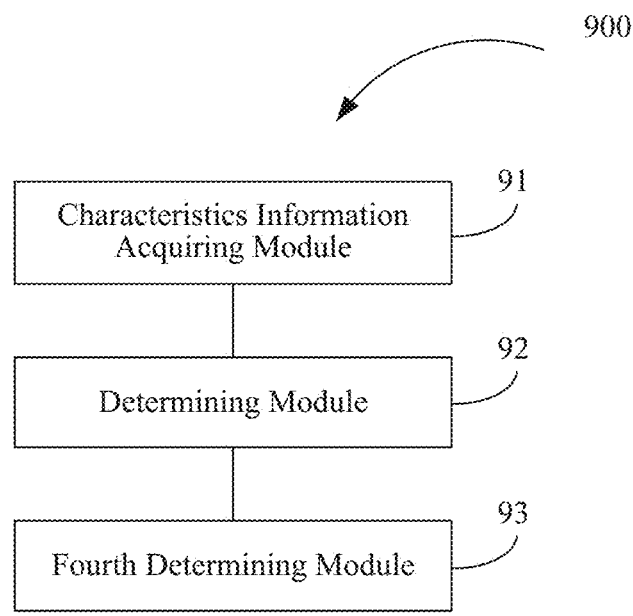
FIG. 9 is a block diagram of an apparatus for identifying an image type, according to still yet another exemplary embodiment.

FIG. 9 is a block diagram of an apparatus 900 for identifying an image type, according to yet another exemplary embodiment. As shown in FIG. 9, the apparatus 900 may include a characteristics information acquiring module 91, a determining module 92, and a fourth determining module 93.

The characteristics information acquiring module 91 is configured to acquire characteristics information of the image to be identified.

In the exemplary embodiment, a characteristics library of synthetic images may be established in advance. The characteristics library includes characteristics information belonging to the synthetic images. Thereby, by acquiring characteristics information of the image to be identified, and comparing the acquired characteristics information with characteristics information of the characteristics library, it is possible to identify whether the image to be identified is a synthetic image.

The characteristics library may include, but is not limited to one or more of characteristics information of pixel numbers in three channels of RGB of synthetic images, characteristics information of monochrome images of synthetic images, and the like.

In the exemplary embodiment, in order to compare with characteristics information in the characteristics library, the characteristics information of pixel numbers in three channels of RGB of the image to be identified may be acquired, or the characteristics information of red image of the image to be identified may be acquired.

The determining module 92 is configured to determine whether the characteristics information of the image to be identified acquired by the characteristics information acquiring module 91 matches characteristics information in a pre-established characteristics library. The characteristics library includes characteristics information belonging to synthetic images.

The fourth determining module 93 is configured to, if the determining module 92 determines that they match, determine the image to be identified as a synthetic image.

For example, in FIGS. 2a-2c, the histograms of RGB three channels of the image to be identified are identical, thereby it can be determined that the pixel numbers for each of RGB three channels of the image to be identified are identical, i.e., characteristics information of the image matches the characteristics information in the characteristics library. Thus it may be determined that the image to be identified is a synthetic image.

In the exemplary embodiment, if the characteristics information of the image to be identified does not match the characteristics information in the pre-established characteristics library, it may be determined that the image to be identified is not a synthetic image.

In some embodiments, in addition to using this manner to identify the image type, it may use this manner to correct an already identified image type. For example, given that an image has been identified as a synthetic image, it may further determine whether the image is a synthetic image by acquiring the characteristics information of the image and comparing the characteristics information with the characteristics information in the characteristics library. Accordingly, the accurate rate of identification is significantly improved.

The apparatus 900 shown in FIG. 9 may be used for implementing the method 500 shown in FIG. 5, and the involved relevant contents are similar, which are not repeated herein.

In the above exemplary embodiment of apparatus 900 for identifying image type, whether an image to be identified is a synthetic image is determined by determining whether the acquired characteristics information in the image to be identified matches characteristics information in the pre-established characteristics library, providing an additional means for identifying a synthetic image. As such, the manners for identifying image type are diversified. In addition, it may correct an already identified image type, thereby greatly improving the accuracy rate of identification.

With respect to the apparatuses in the above exemplary embodiments, the specific manners for performing operations for individual modules and submodules therein have been described in detail in the embodiments regarding the methods, which will not be repeated herein.

Figure 10:
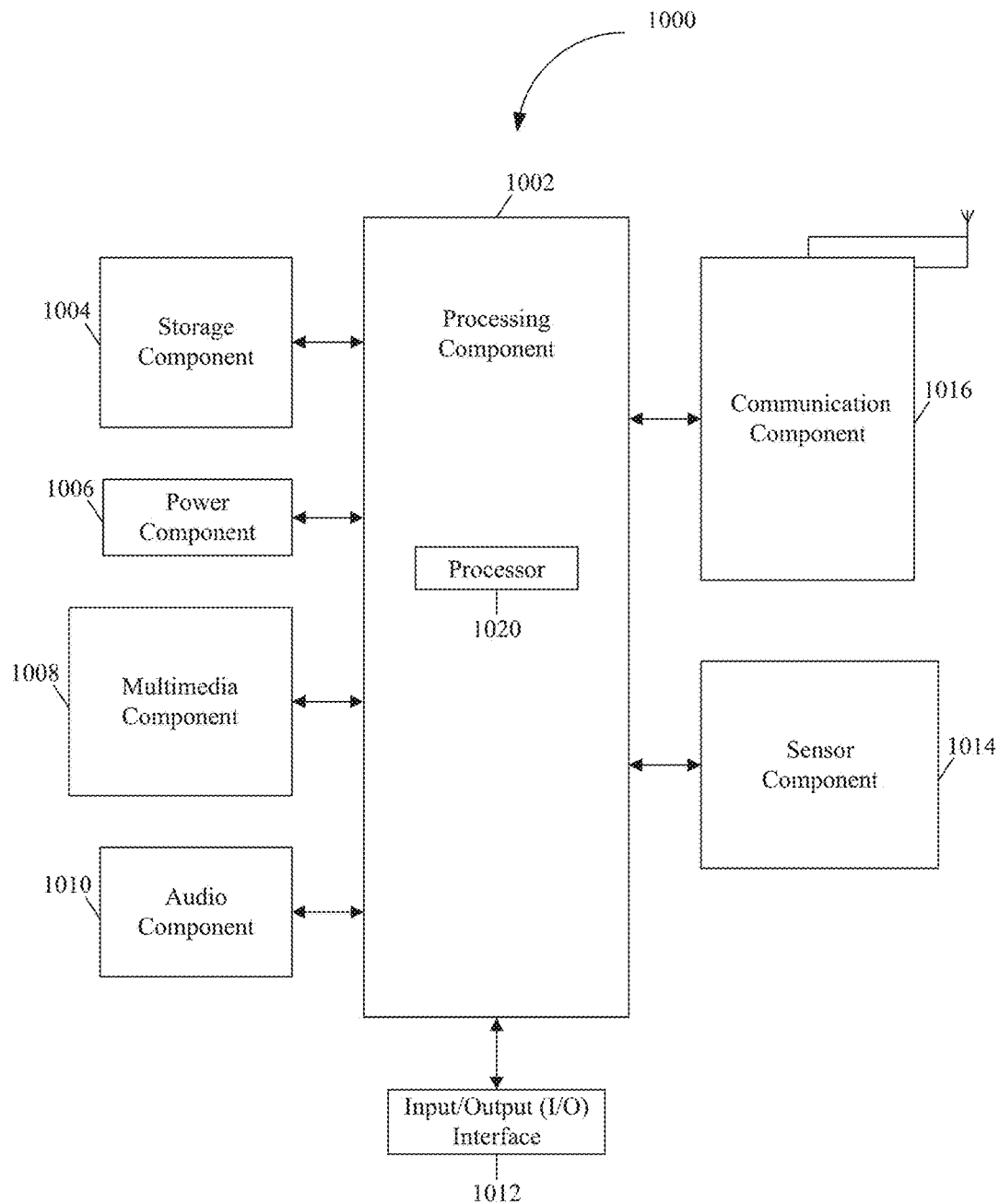
FIG. 10 is a block diagram of a terminal for identifying an image type, according to an exemplary embodiment.

FIG. 10 is a block diagram of a terminal 1000 for identifying an image type, according to an exemplary embodiment. For example, the terminal 1000 may be a mobile phone, a computer, a digital broadcast terminal, a messaging device, a gaming console, a tablet, a medical device, exercise equipment, a personal digital assistant, an aircraft and the like.

Referring to FIG. 10, the terminal 1000 may include one or more of the following components: a processing component 1002, a storage component 1004, a power component 1006, a multimedia component 1008, an audio component 1010, an input/output (I/O) interface 1012, a sensor component 1014, and a communication component 1016.

The processing component 1002 typically controls overall operations of the terminal 1000, such as the operations associated with display, telephone calls, data communications, camera operations, and recording operations. The processing component 1002 may include one or more processors 1020 to execute instructions to perform all or part of the steps in the above described methods. Moreover, the processing component 1002 may include one or more modules which facilitate interactions between the processing component 1002 and other components. For instance, the processing component 1002 may include a multimedia module to facilitate interactions between the multimedia component 1008 and the processing component 1002.

The storage component 1004 is configured to store various types of data to support the operation of the terminal 1000. Examples of such data include instructions for any applications or methods operated on the terminal 1000, contact data, phonebook data, messages, images, video, etc. The storage component 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1006 provides power to various components of the device 1000. The power component 1006 may include a power management system, one or more power sources, and any other components associated with the generation, management, and distribution of power in the terminal 1000.

The multimedia component 1008 includes a screen providing an output interface between the terminal 1000 and a user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1008 may include a front camera and/or a rear camera. The front camera and/or the rear camera may receive an external multimedia datum while the terminal 1000 is in an operation mode, such as a photographing mode or a video mode. Each of the front camera and the rear camera may be a fixed optical lens system or have focus and optical zoom capability.

The audio component 1010 is configured to output and/or input audio signals. For example, the audio component 1010 may include a microphone ("MIC") configured to receive an external audio signal when the terminal 1000 is in an operation mode, such as a call mode, a recording mode, and a voice identification mode. The received audio signal may be further stored in the storage component 1004 or transmitted via the communication component 1016. In some embodiments, the audio component 1010 further includes a speaker to output audio signals.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 may include one or more sensors to provide status assessments of various aspects of the terminal 1000. For instance, the sensor component 1014 may detect an open/closed status of the device 1000, relative positioning of components, e.g., the display and the keypad, of the device 1000, a change in position of the terminal 1000 or a component of the terminal 1000, a presence or absence of user contact with the terminal 1000, an orientation or an acceleration/deceleration of the terminal 1000, and a change in temperature of the terminal 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor, or a temperature sensor.

The communication component 1016 is configured to facilitate wired or wireless communications between the terminal 1000 and other devices. The terminal 1000 can access a wireless network based on a communication standard, such as WiFi, 2G, or 3G, or a combination thereof. In one exemplary embodiment, the communication component 1016 receives a broadcast signal from an external broadcast management system via a broadcast channel or broadcast associated information. In one exemplary embodiment, the communication component 1016 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer-readable storage medium having instructions stored thereon is provided, such as the storage component 1004 having instructions stored thereon. The instructions are executable by the processor 1020 in the terminal 1000, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for identifying an image type, comprising:
acquiring a histogram of a channel in a preset color space of an image to be identified;
calculating a ratio between a quantity of pixels of a gray-scale value and a quantity of pixels of an adjacent gray-scale value in the channel according to the histogram, wherein the calculating of the ratio comprises:
calculating a ratio between a quantity of pixels of a gray-scale value i and a quantity of pixels of a gray-scale value (i−n) in the channel; and
calculating a ratio between the quantity of pixels of the gray-scale value i and a quantity of pixels of a gray-scale value (i+n) in the channel,
wherein n≤i≤255−n, 1≤n≤10, and both i and n are integers;
determining a type of the image according to the ratio; and
processing the image based on the determined type of the image.

2. The method of claim 1, wherein the determining the type of the image comprises:
when the ratio satisfies a preset condition, determining the image as a natural image; and
when the ratio does not satisfy the preset condition, determining the image as a synthetic image.

3. The method of claim 2, wherein:
the preset color space includes a red-green-blue (RGB) color space; and
the preset condition includes a number of decimal places of the ratio exceeding 5.

4. The method of claim 2, wherein when more than one ratio are calculated for the channel, the method further comprises:
counting ratios which do not satisfy the preset condition; and
when a number of the counted ratios exceeds a preset number, determining the image as the synthetic image.

5. The method of claim 1, further comprising:
prior to acquiring the histogram of the channel in the preset color space of the image, filtering out a noise in the image.

6. The method of claim 1, further comprising:
acquiring characteristics information of the image;
determining whether the characteristics information of the image matches characteristics information in a pre-established characteristics library, the characteristics library including characteristics information of synthetic images; and
when the characteristics information of the image matches the characteristics information in the pre-established characteristics library, determining the image as a synthetic image.

7. An apparatus for identifying an image type, comprising:
a processor; and
a memory for storing instructions executable by the processor;
wherein the processor is configured to:
acquire a histogram of a channel in a preset color space of an image to be identified;
calculate a ratio between a quantity of pixels of a gray-scale value and a quantity of pixels of an adjacent gray-scale value in the channel according to the histogram, wherein calculating the ratio comprises:
calculating a ratio between a quantity of pixels of a gray-scale value i and a quantity of pixels of a gray-scale value (i−n) in the channel; and
calculating a ratio between the quantity of pixels of the gray-scale value i and a quantity of pixels of a gray-scale value (i+n) in the channel,
wherein n≤i≤255−n, 1≤n≤10, and both i and n are integers;
determine a type of the image according to the ratio; and
process the image based on the determined type of the image.

8. The apparatus of claim 7, wherein the processor is further configured to:
when the ratio satisfies a preset condition, determine the image as a natural image; and
when the ratio does not satisfy the preset condition, determine the image as a synthetic image.

9. The apparatus of claim 8, wherein:
the preset color space includes a red-green-blue (RGB) color space; and
the preset condition includes a number of decimal places of the ratio exceeding 5.

10. The apparatus of claim 8, wherein when more than one ratio are calculated, the processor is further configured to:
count ratios which do not satisfy the preset condition; and
when a number of the counted ratios exceeds a preset number, determine the image as the synthetic image.

11. The apparatus of claim 7, wherein the processor is further configured to:
prior to acquiring the histogram of the channel in the preset color space of the image, filter out a noise in the image.

12. The apparatus of claim 7, wherein the processor is further configured to:
acquire characteristics information of the image;
determine whether the acquired characteristics information of the image matches characteristics information in a pre-established characteristics library, the characteristics library including characteristics information of synthetic images; and
when it is determined the acquired characteristics information of the image matches the characteristics information in the pre-established characteristics library, determine the image as a synthetic image.

13. A non-transitory computer-readable storage medium having stored thereon instructions that, when executed by a processor in a terminal, cause the terminal to perform a method for identifying an image type, the method comprising:
acquiring a histogram of a channel in a preset color space of an image to be identified;
calculating a ratio between a quantity of pixels of a gray-scale value and a quantity of pixels of an adjacent gray-scale value in the channel according to the histogram, wherein the calculating of the ratio comprises:
calculating a ratio between a quantity of pixels of a gray-scale value i and a quantity of pixels of a gray-scale value (i−n) in the channel; and
calculating a ratio between the quantity of pixels of the gray-scale value i and a quantity of pixels of a gray-scale value (i+n) in the channel,
wherein n≤i≤255−n, 1≤n≤10, and both i and n are integers;
determining a type of the image according to the ratio; and
processing the image based on the determined type of the image.

14. The non-transitory computer-readable storage medium of claim 13, wherein the determining the type of the image comprises:
when the ratio satisfies a preset condition, determining the image as a natural image; and
when the ratio does not satisfy the preset condition, determining the image as a synthetic image.

15. The non-transitory computer-readable storage medium of claim 13, wherein:
   the preset color space includes a red-green-blue (RGB) color space; and
   the preset condition includes a number of decimal places of the ratio exceeding 5.

16. The non-transitory computer-readable storage medium of claim 13, wherein when more than one ratio are calculated for the channel, the method further comprises:
   counting ratios which do not satisfy the preset condition; and
   when a number of the counted ratios exceeds a preset number, determining the image as the synthetic image.

17. The non-transitory computer-readable storage medium of claim 13, further comprising:
   prior to acquiring the histogram of the channel in the preset color space of the image, filtering out a noise in the image.

18. The non-transitory computer-readable storage medium of claim 13, further comprising:
   acquiring characteristics information of the image;
   determining whether the characteristics information of the image matches characteristics information in a pre-established characteristics library, the characteristics library including characteristics information belonging to synthetic images; and
   when the characteristics information of the image matches the characteristics information in the pre-established characteristics library, determining the image as a synthetic image.

* * * * *